5,484,335

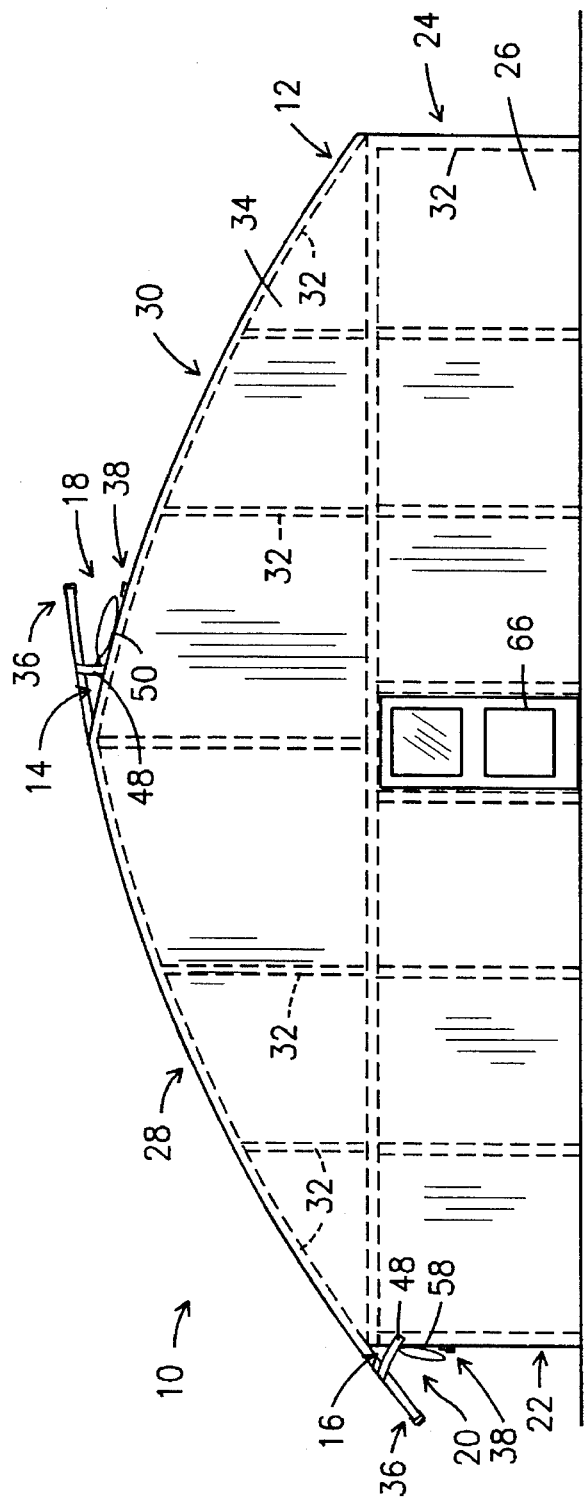
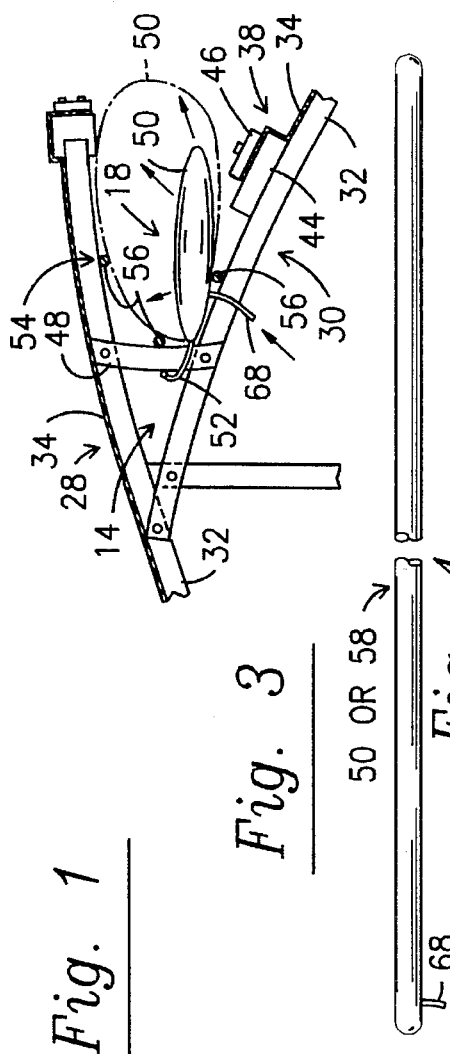
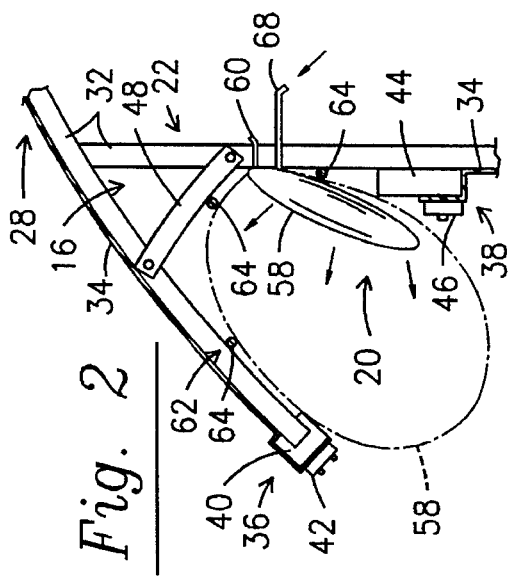
Fig. 1
Fig. 2
Fig. 3
Fig. 4

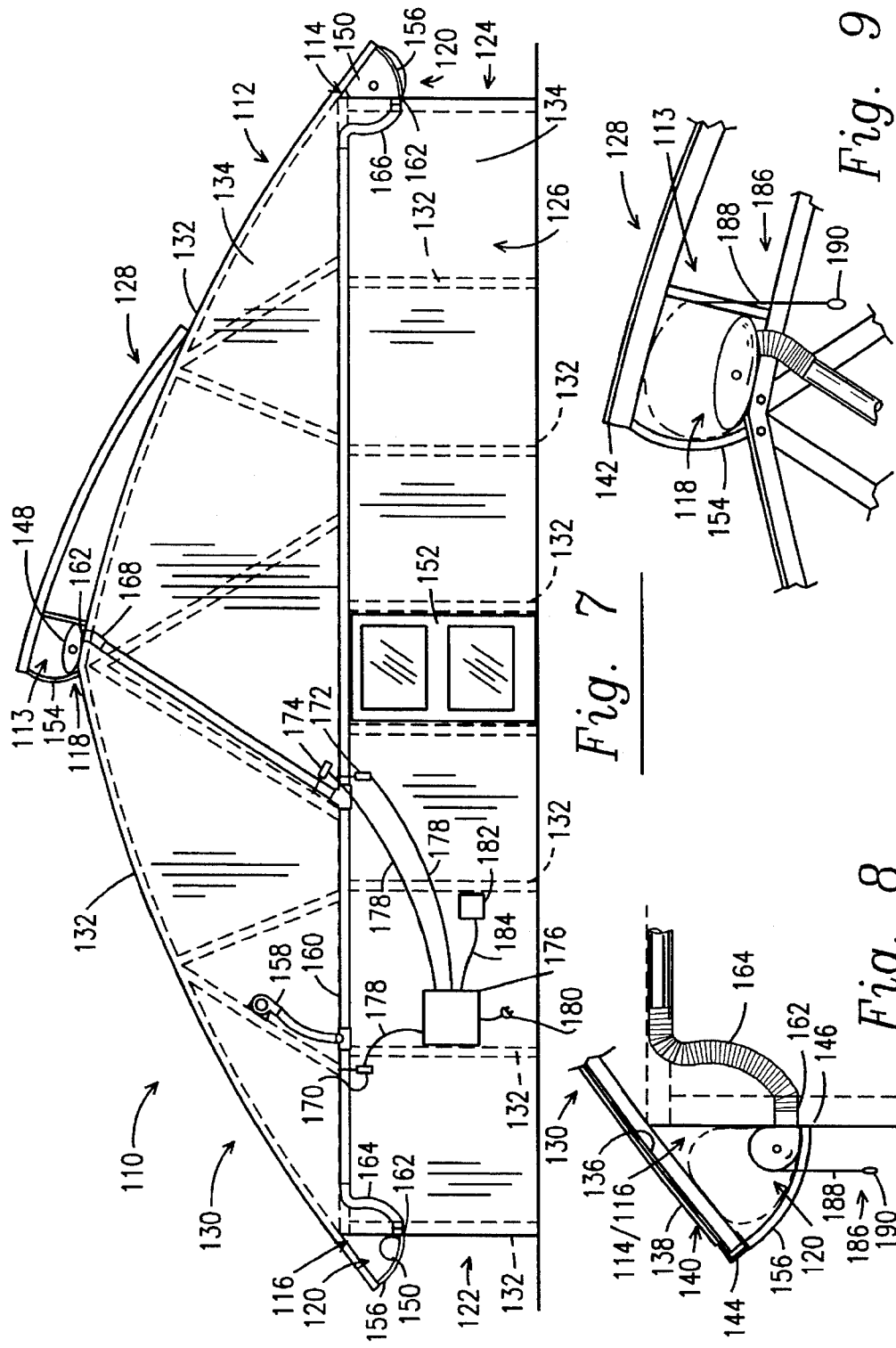

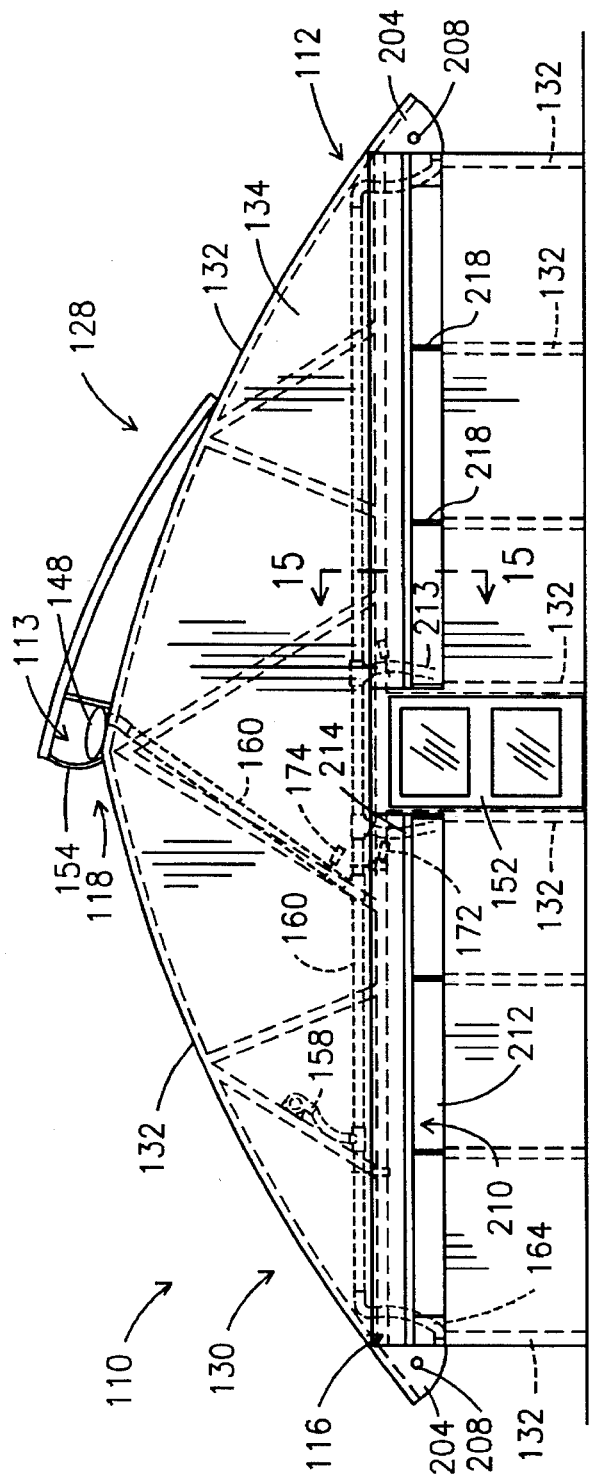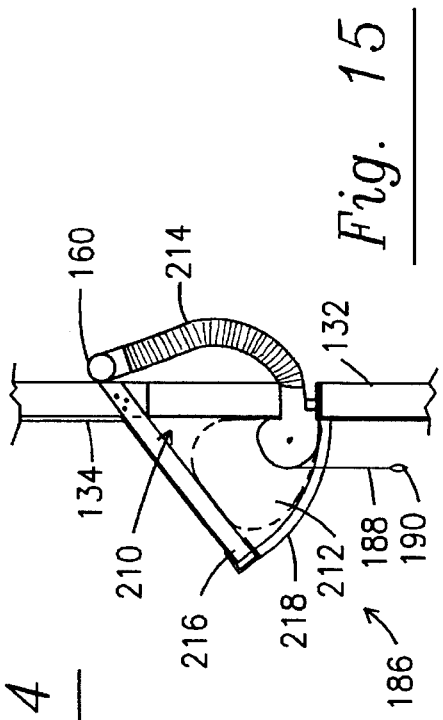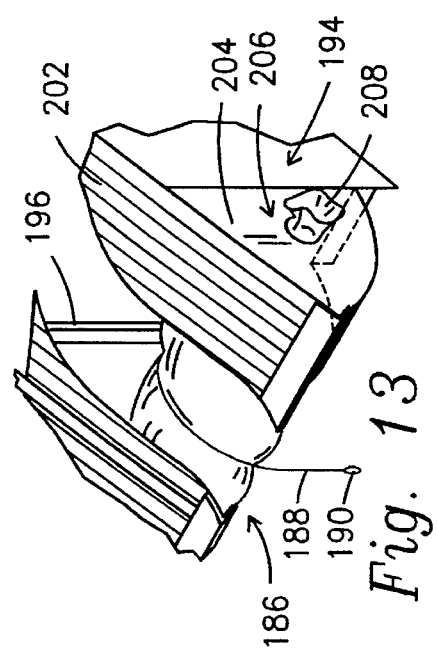

VENTILATED ENCLOSURE

CROSS-REFERENCE

This is a continuation-in-part application of application Ser. No. 937,444 filed Aug. 27, 1992 abandoned, which was a continuation-in-part of U.S. Pat. No. 5,000,080, issued Mar. 19, 1991.

BACKGROUND OF THE INVENTION

1. Field of the Invention

A ventilated enclosure including a first and second elongated inflatable member each movable between a first and second position to selectively seal a ridge vent and side vent or vents respectively to control air circulation through the ventilated enclosure.

2. Description of the Prior Art

Numerous efforts have been undertaken to provide greenhouse or enclosure construction with selective venting and circulation therethrough to control humidity and temperature within the greenhouse or enclosure.

It is common to ventilate a greenhouse or enclosure with a ridge opening in combination with side wall openings to provide air flow using shutters or other closure means to control air flow through the greenhouse or enclosure.

U.S. Pat. No. 4,399,738 discloses a ventilation means including an elongated tubular inflatable member disposed adjacent a ridge vent extending along the ridge of the enclosure and a side vent along extending the side wall of the enclosure having an elongated tubular inflatable member disposed adjacent thereto such that the elongated tubular inflatable members when deflated permit circulation of air through the side vent and ridge vent and the elongated tubular inflatable members seal the ridge and side vents when inflated.

U.S. Pat. No. 4,438,680 shows an enclosure comprises a glazing structure and glazing bars including a ridge to support the glazing structure. The ridge includes vents opening into the enclosure defined by the glazing structure and into the ambient atmosphere. A blower exhausts air from the enclosure into the ambient atmosphere.

U.S. Pat. No. 3,791,076 shows means for affixing or securing a flexible membrane to a tubular section.

United Kingdom 1,250,065 discloses a ventilating apparatus including a pair of solid rollers disposed at opposite ends of the roof line to seal vents formed therein in cooperation with corresponding pairs of substantially flat surfaces.

Japanese 84,944 teaches overlapping spaced roof sections.

U.S. Pat. No. 1,070,434 disclosed a greenhouse with sash bars extending from the lower edge of one side of the roof to the peak of the roof and thence to the lower edge of the other side of the roof.

U.S. Pat. No. 3,401,621 shows the venting of an interior structure by means of a blower mounted near the ridge line of the structure.

U.S. Pat. No. 3,063,191 discloses an artificially climatized greenhouse including a ridge ventilation. Similarly, U.S. Pat. No. 3,562,972 shows a greenhouse construction for environmental or climate control.

Additional examples of similar construction are shown in U.S. Pat. Nos. 2,046,600; 3,274,730; 3,874,114; 3,063,195; 3,777,425; 4,027,437; 4,055,030; 4,141,798; 4,196,544; 4,216,618; 4,262,656; 4,283,889; 4,301,626; 4,316,405; 4,318,251; 4,352,259; 4,366,646; 4,387,533; 4,452,230; 4,470,405; 4,505,066; 4,510,921; 4,515,150; 4,565,230; 4,567,732; and 4,569,150.

SUMMARY OF THE INVENTION

The present invention relates to a ventilated greenhouse or enclosure including a ridge vent and side vent in combination with a first and second elongated inflatable member to selectively control air flow through the ridge vent and side vent respectively.

The enclosure comprises a first and second side wall, a pair of end walls and a first and second roof section. The first and second side walls, end walls and first and second roof sections are constructed of frame members having a clear membrane such as polyethylene, fiberglass, alsynite or the like secured thereto.

The clear membrane is secured to opposite ends of the first roof section by a pair of first primary sealing/securing means, while the clear membrane is secured to the upper portions of the second roof section and the first side wall in spaced relationship relative to the upper ends of the second roof section and the side wall by a pair of second primary sealing/securing means.

Opposite ends of the first roof section are held in overlapping, spaced relationship relative to the upper portions of the second roof section and the first side wall by a plurality interconnecting brace members.

The first and second elongated oblong inflatable members are anchored to the enclosure by a plurality of anchor elements. A plurality of inner retainer members arranged in triangular relationship relative to each other are disposed to selectively engage the first and second elongated inflatable members when inflated. Each inner retainer member comprises an elongated sealing element extending substantially the length of the elongated oblong inflatable members.

A blower or air pressure source is coupled to the first and second elongated inflatable members through air feed lines to selectively inflate and deflate the first and second elongated inflatable members to selectively control the air flow through the ventilated greenhouse or enclosure.

In use, when the first and second elongated inflatable members are deflated, air flows freely from the side vent through the enclosure and out the ridge vent as the warmer air rises.

When fully inflated, the first and second elongated inflatable members engage the respective first and second primary sealing/securing means and the respective inner retainer members.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 1 is an end view of the ventilated greenhouse or enclosure with a single side vent.

FIG. 2 is a detailed end view of the second elongated inflatable member.

FIG. 3 is a detailed end view of the first elongated inflatable member.

FIG. 4 is a longitudinal view of the first or second elongated inflatable member in the first or deflated position.

FIG. 7 is an end view of an alternate embodiment the ventilated greenhouse or enclosure with a pair of side vents.

FIG. 8 is a detailed end view of the second elongated inflatable member of the alternate embodiment shown in FIG. 7.

FIG. 9 is a detailed end view of the first elongated inflatable member of the alternate embodiment shown in FIG. 7.

FIG. 13 is a detailed partial perspective view of the sealing means shown in FIG. 12 with the second elongated inflatable member inflated.

FIG. 14 is an end view of the ventilated green house or enclosure with an end vent.

FIG. 15 is a detailed cross-section end view of the end vent taken along line 15—15 of FIG. 14.

Similar reference characters refer to similar parts throughout the several views of the drawings.

DETAILED DESCRIPTION OF THE PREFERRED EMBODIMENT

Figure 5:
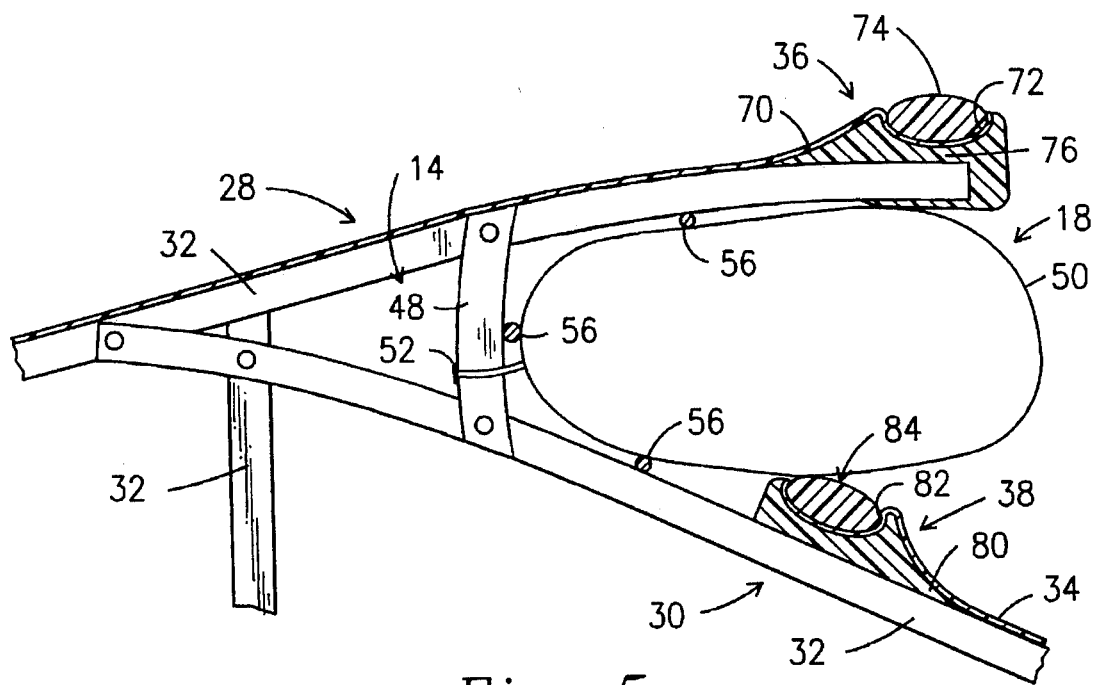
FIG. 5 is a detailed end view of the first sealing means, second sealing means and inner retainer members.

As shown in FIG. 1, the present invention relates to a ventilated greenhouse or enclosure generally indicated as 10 comprising an enclosure generally indicated as 12 including a ridge vent and side vent generally indicated as 14 and 16 respectively in combination with a first and second elongated inflatable member generally indicated as 18 and 20 respectively to selectively control air flow through the ridge vent 14 and side vent 16 respectively.

The enclosure 12 comprises a side wall including a first and second substantially parallel vertical side wall generally indicated as 22 and 24 respectively and a pair of substantially parallel vertical end walls each generally indicated as 26 in combination with a roof including a first and second roof section generally indicated as 28 and 30 respectively. Alternately the side wall may comprise a substantially vertical circular side wall member; while, the roof may comprise a single roof section.

The first and second substantially parallel vertical side walls 22 and 24, pair of substantially parallel vertical end walls 26 and first and second roof sections 28 and 30 are constructed of frame members each indicated as 32 having a clear membrane 34 such as polyethylene or the like secured thereto.

As best shown in FIG. 1, the clear membrane 34 is secured to opposite ends of the first roof section 28 by a pair of first sealing means extending substantially the length of the first and second elongated inflatable member 18 and 20 each generally indicated as 36, while the clear membrane 34 is secured to the upper portions of the second roof section 30 and the first substantially parallel vertical side wall 22 in spaced relationship relative to the upper ends of the second roof section 30 and the first substantially parallel vertical side wall 22 by a pair of second sealing means extending substantially the length of the first and second elongated inflatable member 18 and 20 each generally indicated as 38.

As best shown in FIGS. 2 and 3, each first sealing means 36 comprises a hollow cap 40 affixed to opposite ends of the frame members 32 of the first roof section 28 by a first attachment element 42 press fitting the clear membrane 34 therebetween. Each second sealing means 38 comprises a securing plate 44 affixed to the upper portions of the second roof section 30 and the first substantially parallel vertical side wall 22 by a second attachment element 46 press fitting the clear membrane 34 therebetween. Opposite ends of the first roof section 28 are held in overlapping, spaced relationship relative to the upper portions of the second roof section 30 and the first substantially parallel vertical side wall 22 by a plurality of interconnecting brace members each indicated as 48.

As best shown in FIGS. 3 and 5, the first elongated inflatable member 18 comprises a substantially horizontal elongated oblong inflatable member 50 anchored to the enclosure 12 by a plurality of anchor elements each indicated as 52. A plurality of inner retainer members each generally indicated as 54 are disposed in triangular relationship relative to each other. Each inner retainer member 54 comprises an elongated element 56 extending substantially the length of the substantially horizontally disposed elongated oblong inflatable member 50.

As best shown in FIG. 2, the second elongated inflatable member 20 comprises a substantially vertically disposed elongated oblong inflatable member 58 anchored to the enclosure 12 by a plurality of anchor elements each indicated as 60. A plurality of inner retainer members each generally indicated as 62 are disposed in triangular relationship relative to each other. Each inner retainer member 62 comprises an elongated element 64 extending substantially the length of the substantially vertically disposed elongated oblong inflatable member 58.

As shown in FIG. 1, at least one door 66 is formed in one of the substantially parallel vertical end walls 26.

A blower or air pressure source (not shown) is coupled to the first and second elongated inflatable members 18 and 20 through air feed lines 68 (FIG. 4) to control the extent or degree of inflation of the first and second elongated inflatable members 18 and 20.

Figure 6:
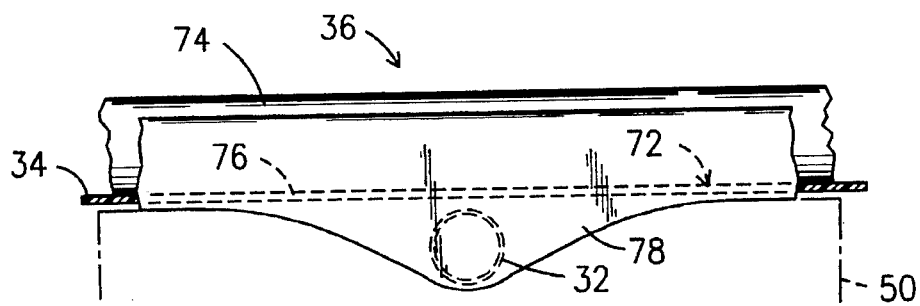
FIG. 6 is a detailed front view of the first sealing means.
Figure 5:
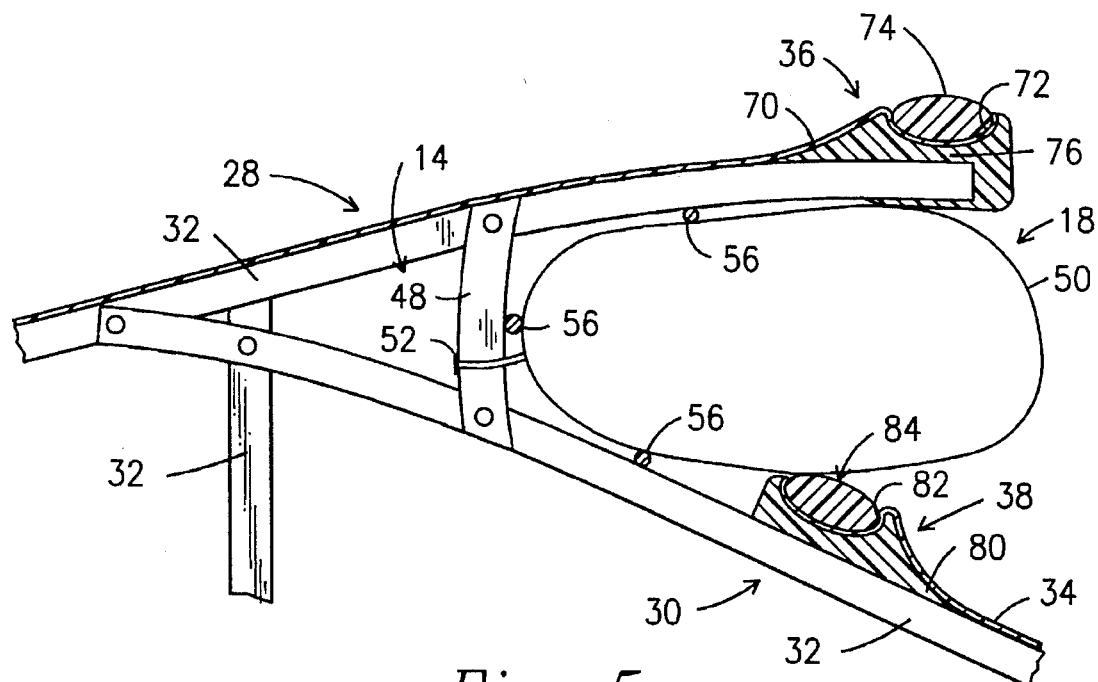
Figure 6:
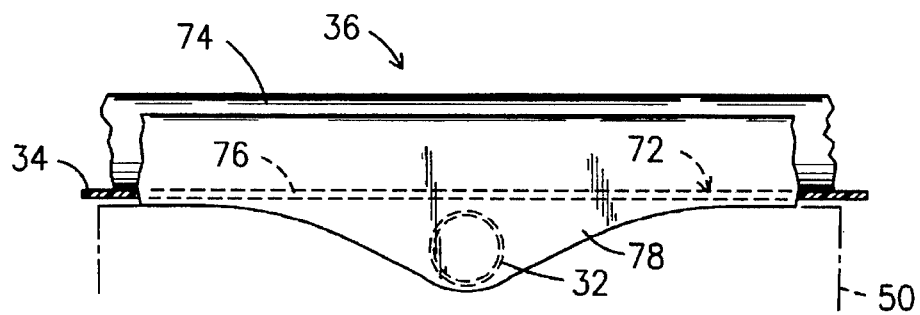
Figure 10:
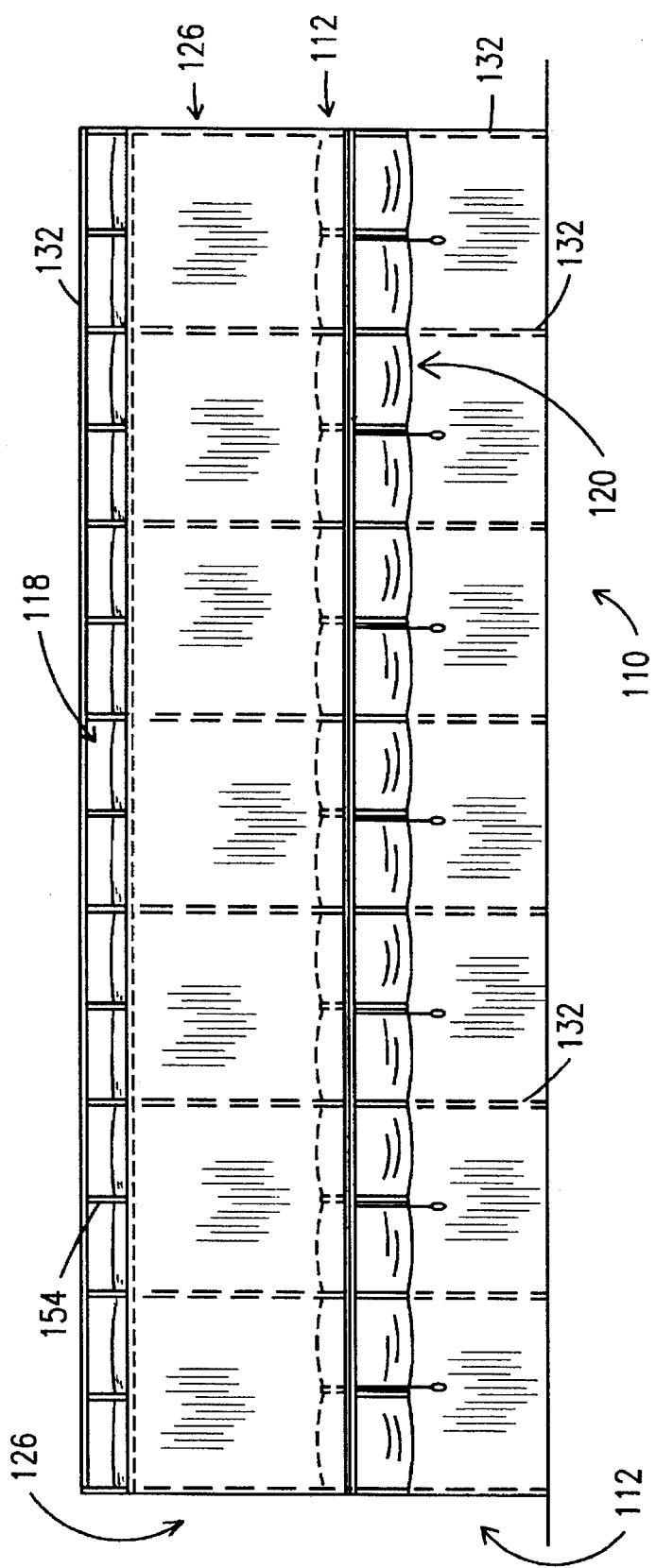
FIG. 10 is a side view of the alternate embodiment of the ventilated greenhouse or enclosure shown in FIG. 7.

Alternately, as shown in FIGS. 5 and 6, each first sealing means 36 comprises an elongated flat base plate 70 having a channel or recess 72 formed the length thereof affixed to opposite ends of the tubular frame members 32 of the first roof section 28 and an elongated member 74 to press fit the clear membrane 34 into the channel or recess 72 in combination with an upper substantially horizontal element 76 and a sealing element 78 mounted on opposite ends of the frame member 32 of the first roof section 28 adjacent the respective channels or recesses 72. Although the upper substantially horizontal element 76 and sealing element 78 are shown as an integrated or unitary part, these two elements may be separate parts. The second sealing means 38 comprises an elongated flat base plate 80 having a channel or recess 82 formed the length thereof affixed to the upper portions of the second roof section 30 and the first substantially parallel vertical side wall 22 and an elongated securing member 84 to press fit the clear membrane 34 into the channel or recess 82. As shown in FIG. 6, the v-shaped sealing element 78 engages the first elongated inflatable member 18 to seal the open area and immediately adjacent the frame member 32.

In use, when the first and second elongated inflatable member 18 and 20 are deflated as shown in FIGS. 2 and 3 as depicted by the solid lines, air flows freely through the side vent 16 and enclosure 12 and out the ridge vent 14.

As shown in FIGS. 2 and 3, when fully inflated as depicted by the phantom lines, the forward portions of the first and second elongated inflatable member 18 and 20 engage the respective first and second sealing means 36 and 38. In addition, the rear portions of first and second elongated inflatable members 18 and 20 engage of the plurality of inner retainer members 56 and 64 respectively ensuring the sealing of the first and second sealing means 36 and 38 by forcing the first and second elongated inflatable members 18 and 20 outwardly from the ridge vent 14 and side vent 16.

FIGS. 7 through 10 show an alternate embodiment of the ventilated enclosure generally indicated as 110 comprising an enclosure generally indicated as 112 including a ridge vent generally indicated as 113 and a first and second side vent generally indicated as 114 and 116 respectively in combination with first and pair of second elongated inflatable members generally indicated as 118 and 120 respectively to selectively control air flow through the ridge vent 113 and first and second 114 and 116 respectively.

The enclosure 112 comprises a side wall including a first and second substantially parallel vertical side wall generally indicated as 122 and 124 respectively and a pair of substantially parallel vertical end walls each generally indicated as 126 in combination with a roof including a first and second roof section generally indicated as 128 and 130 respectively. Alternately the side wall may comprise a substantially vertical circular side wall member; while, the roof may comprise a single roof section.

The first and second substantially parallel vertical side walls 122 and 124, pair of substantially parallel vertical end walls 126 and first and second roof sections 128 and 130 are constructed of frame members each indicated as 132 having a clear membrane 134 such as polyethylene or the like secured thereto. The clear membrane 134 may comprise an inner and outer element indicated as 136 and 138 respectively (FIG. 8) to cooperatively form an insulation barrier or pocket 140 therebetween as described more fully hereinafter.

The alternate embodiment of FIGS. 7 through 10 may include a first sealing means 36, second sealing means 38 and plurality of inner retainer members 56 and 64 as described with reference to FIGS. 1 through 6. However, as shown in FIGS. 7 through 10, the clear membrane 134 is secured to opposite ends of the first roof section 128 by an elongated first sealing/attachment member 142 extending substantially the length of the first and second elongated inflatable members 118 and 120. The clear membrane 134 is secured to opposite ends of the second roof section 130 by an elongated second sealing/attachment member 144 extending substantially the length of the first and second elongated inflatable members 118 and 120. The clear membrane 134 is secured to the mid to upper portions of the first and second substantially vertical side walls 122 and 124 by an elongated third sealing/attachment member 146 extending substantially the length of the second elongated inflatable member 120. Opposite ends of the first roof section 128 are disposed in overlapping, spaced relationship relative to the upper portions of the second roof section 130 and the second substantially parallel vertical side wall 124, while the lower end of the second roof section 130 is disposed in overlapping, spaced relationship relative to the upper portion of the first substantially vertical side wall 122.

The first elongated inflatable member 118 comprises an horizontal elongated oblong inflatable member 148, while the second elongated inflatable members 120 comprise an elongated oblong inflatable members 150.

As shown in FIG. 7, at least one door 152 is formed in at least one of the substantially parallel vertical end walls 126.

A plurality of arcuate outer retainer members each indicated as 154 extend between the elongated first attachment member 142 affixed to the upper end of the first roof section 128 and the elongated second attachment member 144 affixed to the upper end of the second roof section 130 adjacent the ridge vent 114 to engage the outer portion of first elongated inflatable member 118 when inflated. A plurality of arcuate outer retainer members each indicated as 156 extend between the elongated first sealing/attachment member 142 affixed to the lower end of the first roof section 128 and the elongated third sealing/attachment member 146 of the second substantially vertical side wall 124 adjacent the corresponding side vent 116 to engage the outer portion of the corresponding second elongated inflatable member 120 when inflated and between the elongated second sealing/attachment member 144 affixed to the lower end of the second roof section 130 and the elongated third sealing/attachment member 146 of the first substantially vertical side wall 122 adjacent the corresponding side vent 116 to engage the corresponding second elongated inflatable member 120 when inflated.

As best shown in FIG. 7, a first reversible blower or air pressure source 158 is operable in a pressure mode and vacuum mode operatively coupled to the first and second elongated inflatable members 118 and 120 through conduit generally indicated as 160 and apertures 162 to control the inflation or deflation thereof.

The conduit 160 includes a first, second and third conduit branch indicated as 164, 166 and 168 respectively having a first, second and third control valves indicated as 170, 172 and 174 disposed respectively therein each movable between an open and closed position to selectively control the flow of air through the corresponding conduit branch 164, 166 and 168 respectively. The reversible blower or air pressure source 158, first, second and third control valves 170, 172 and 174 are coupled to a system control panel 176 through conductors 178 to selectively control the pressure mode or vacuum mode and the position of the first, second and third control valves 170, 172 and 174. The control panel 176 including state of the art logic is coupled to a power source (not shown) through conductor 180 and a sensor module 182 through conductor 184. The sensor module 182 may include state of the art temperature sensor to sense the temperature within the enclosure 112. The system control panel 176 includes logic to actuate the reversible blower or air pressure source 158 in the pressure or vacuum mode and first, second and third control valves 170, 172 and 174 to selectively inflate or deflate either the first and/or second elongated inflatable members 118 and 120 independent of each other upon the sensing of a predetermined with upper or lower temperatures.

A plurality of deflating elements each generally indicated as 186 is coupled to the enclosure 112 to assist in the deflation of the first and second elongated in latable members 118 and 120. Each deflating element 186 comprises a flexible line 188 affixed to frame members 132 in surrounding relationship to the first and second elongated inflatable members 118 and 120 and a weighted member 190 affixed to the lower end of the corresponding flexible line 186.

When the first and second elongated inflatable members 118 and 120 are deflated as shown in FIGS. 7 and 9 in solid lines, air flows freely through the side vents 16 and enclosure 12 and out the ridge vent 14.

When fully inflated the forward portions of the first and second elongated inflatable members 118 and 120 engage the arcuate upper retainer elements 154 and arcuate lower retainer elements 156 respectively.

In addition, the rear portions of the first and second elongated inflatable members 18 and 20 engage of the plurality of inner retainer members 56 and 64 respectively insuring the sealing.

Figure 12:
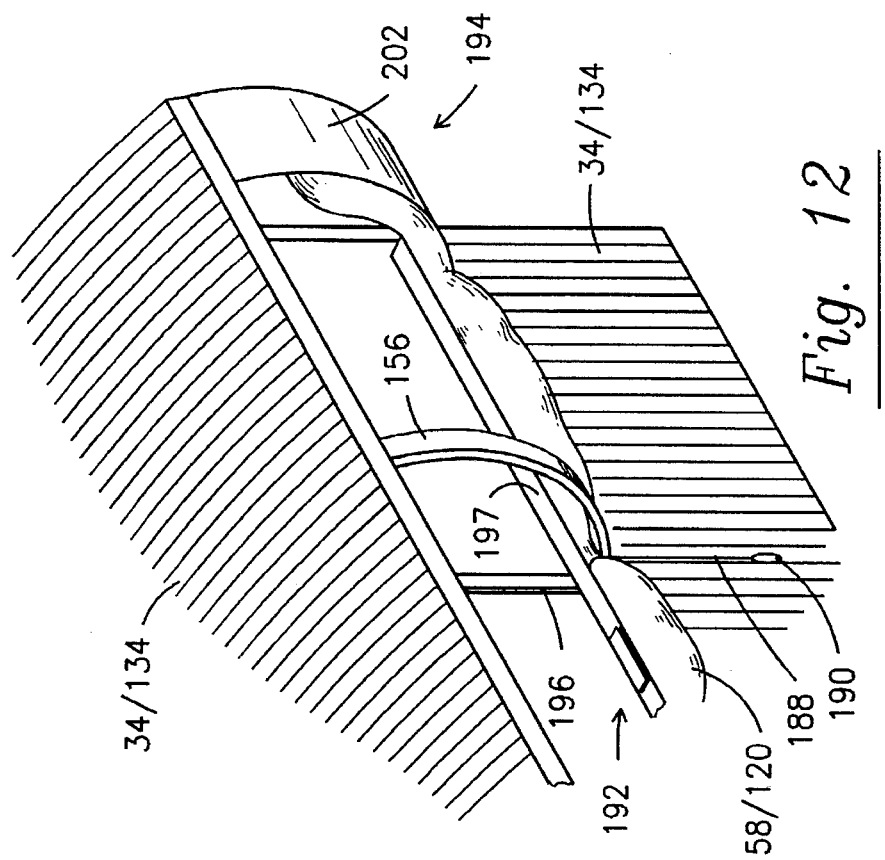
FIG. 12 is a partial perspective view of a sealing means with the second elongated inflatable member deflated.
Figure 11:
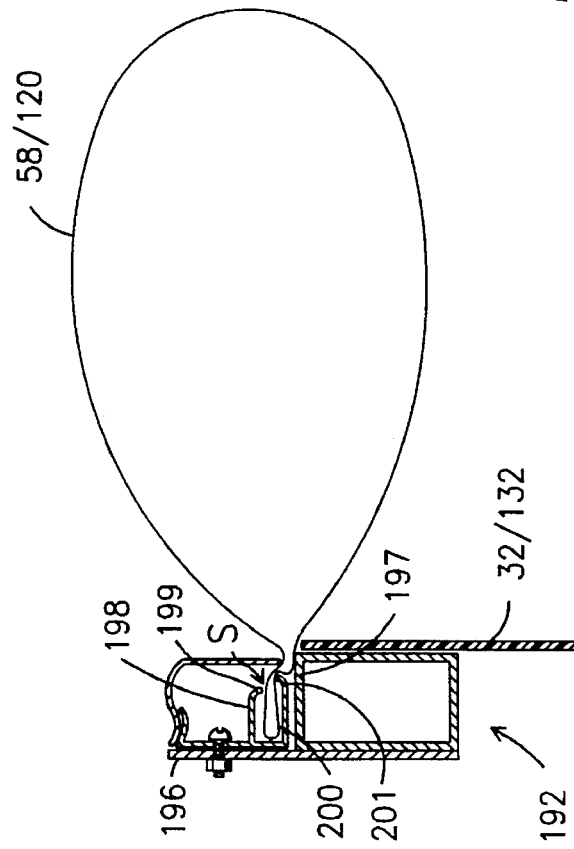
FIG. 11 is a detailed side view of an alternate embodiment for attaching the second elongated inflatable member.

FIGS. 11 through 13 show an anchor means generally indicated as 192 to secure or anchor the inflatable member 58/120 to the enclosure 12/112 and an end sealing means generally indicated as 194 is seal the end portion of the inflatable member 58/120.

As best shown in FIG. 11, the anchor means 192 comprises a member 196 to secure a first clamping member 198 and a second clamping member 200 to the frame members 32/132 or horizontal frame member 197 attached to frame member 32/132. As shown, the first and second clamping members 198 and 200 are disposed in substantially parallel relationship relative to each other to cooperatively form a slot S to receive and secure the inner edge of the inflatable members 58/120 to the enclosure 12/112. To enhance the securing of the inflatable member 58/120, a first gripping element 199 formed on the outer end of the first clamping member 198 adjacent the slot S and a second gripping element 201 formed on the outer end of the second clamping member 200 adjacent the slot S.

As best shown in FIGS. 12 and 13, the end sealing means 194 comprises an arcuate or convex side sealing member 202 attached to the enclosure 12/112 disposed to engage and seal the side of the end portion of the inflatable members 58/120 when inflated and a flat end sealing member 204 including a centrally disposed aperture 206 formed therethrough to receive the end 208 of the inflatable members 58/120 therethrough to engage and seal the end of the inflatable members 58/120 when inflated. Of course, the end sealing means 194 can be used on the first elongated inflatable members 50/118.

FIGS. 14 and 15 show yet another embodiment similar to the embodiment shown in FIGS. 7 through 10 including an end vent. The ventilated enclosure generally indicated as 110 comprises an enclosure generally indicated as 112 including a ridge vent generally indicated as 113 and a first and second side vent generally indicated as 114 and 116 respectively in combination with first and pair of second elongated inflatable members generally indicated as 118 and 120 respectively to selectively control air flow through the ridge vent 113 and first and second 114 and 116 respectively.

The enclosure 112 comprises a side wall including a first and second substantially parallel vertical side wall generally indicated as 122 and 124 respectively and a pair of substantially parallel vertical end walls each generally indicated as 126 in combination with a roof including a first and second roof section generally indicated as 128 and 130 respectively. Alternately the side wall may comprise a substantially vertical circular side wall member; while, the roof may comprise a single roof section.

The first and second substantially parallel vertical side walls 122 and 124, pair of substantially parallel vertical end walls 126 and first and second roof sections 128 and 130 are constructed of frame members each indicated as 132 having a clear membrane 134 such as polyethylene or the like secured thereto. The clear membrane 134 may comprise an inner and outer element indicated as 136 and 138 respectively (FIG. 8) to cooperatively form an insulation barrier or pocket 140 therebetween as described more fully hereinafter.

As shown in FIG. 14, at least one door 152 is formed in at least one of the substantially parallel vertical end walls.

As best shown in FIG. 14, a first reversible blower or air pressure source 158 is operable in a pressure mode and vacuum mode operatively coupled to the first and second elongated inflatable members 118 and 120 through conduit generally indicated as 160 and apertures 162 to control the inflation or deflation thereof.

The end vent 210 is sealable by an elongated inflatable member 212 coupled to the pressure source 158 through a fourth control valve 213 and at least one conduit branch 214. Movement of the elongated inflatable member 212 when inflated relative to the end vent 210 is restricted by a plurality of support members each indicated as 216, a plurality of arcuate outer retainer members each indicated as 218. The operation of this embodiment is similar to those previously described.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A ventilated enclosure comprising a pair of side walls, a pair of end walls and a roof including at least one roof section, a ridge vent having an upper and lower portion formed adjacent a portion of said roof section and at least one side vent having an upper and a lower portion formed adjacent a portion of one of said side walls, a first elongated inflatable member disposed adjacent said side vent and a second elongated inflatable member disposed adjacent said side vent, said first and second elongated inflatable members each movable between a first and second position disposed in operative relationship relative to said ridge vent and said side vent respectively to selectively control air flow through said ridge vent and said side vent respectively and to permit air circulation through said ventilated enclosure when said first and second elongated inflatable members are each in said first position and to seal said ridge vent and said side vent respectively when said first and second elongated inflatable members are each in the second position, a first sealing member and second sealing member each extending substantially the length of said first elongated inflatable member adjacent said upper portion and lower portion of said ridge vent respectively to engage said first elongated inflatable member when in said second position to seal said ridge vent and a first sealing member and second sealing member each extending substantially the length of said second elongated inflatable member adjacent said upper portion and said lower portion of said side vent respectively to engage said second elongated inflatable member when in said second position to seal said side vent and an end sealing means disposed adjacent opposite end portions of said second elongated inflatable member to engage opposite end portions of said second elongated inflatable means when said second elongated inflatable means is in said second position to seal the end portions thereof.

2. The ventilated enclosure of claim 1 wherein said end sealing means comprises an arcuate member disposed to engage and seal the side of the end portion of said second elongated inflatable member when said second elongated inflatable means is in said second position.

3. The ventilated enclosure of claim 2 wherein said end sealing means further includes an end sealing member to engage and seal the end of said second elongated inflatable member when said second position.

4. The ventilated enclosure of claim 3 wherein said end sealing means includes an aperture formed therethrough to receive the end of said second elongated inflatable member therethrough.

5. The ventilated enclosure of claim 1 further including anchor means to secure said second elongated inflatable member to said ventilated enclosure comprising a first clamping member and a second clamping member to receive a portion of said second elongated inflatable member therebetween.

6. The ventilated enclosure of claim 5 wherein said first clamping member comprises a flat element having a first gripping element formed on the outer end thereof and said second clamping member comprises a flat element having a second gripping element formed on the outer end thereof, said first clamping member and said second clamping member cooperatively forming a slot therebetween to receive a portion of said second elongated inflatable member therebetween.

7. The ventilated enclosure of claim 6 wherein said flat elements of said first and second clamping members are disposed in substantially parallel relationship relative to each other and said first gripping element and said second gripping element to cooperatively form said slot to receive and secure the inner edge of said second inflatable member to said ventilated enclosure.

8. The ventilated enclosure of claim 1 further including at least one elongated inner retainer element extending substantially the length of said ridge vent to engage the rear portion thereof in said first elongated inflatable member when in said second position to insure sealing thereof with first and second sealing member by forcing said first elongated inflatable member outwardly relative to said ridge vent and at least one elongated inner retainer element extending substantially the length of said side vent to engage the rear portion of said second elongated inflatable member when in said second position to insure sealing thereof with said first and second sealing member by forcing said second elongated inflatable member outward relative to said side vent.

9. A ventilated enclosure comprising a pair of side walls and a pair of end walls and a roof including at least one roof section, a ridge vent having an upper and lower portion formed adjacent a portion of said roof section and at least one end vent having an upper portion and a lower portion formed adjacent a portion of at least one of said end walls, a first elongated inflatable member disposed adjacent said ridge vent and a second elongated inflatable member disposed adjacent said end vent, said first and second elongated inflatable members each movable between a first and second position disposed in operative relationship relative to said ridge vent and said end vent respectively to selectively control air flow through said ridge vent and said end vent respectively and to permit air circulation through said ventilated enclosure when said first and second elongated inflatable members are each in said first position and to seal said ridge vent and said end vent respectively when said first and second elongated inflatable members are each in the second position, a first sealing member and second sealing member each extending substantially the length of said first elongated inflatable member adjacent said upper portion and lower portion of said ridge vent respectively to engage said first elongated inflatable member when in said second position to seal said ridge vent and a first sealing member and second sealing member each extending substantially the length of said second elongated inflatable member adjacent said upper portion and said lower portion of said end vent respectively to engage said second elongated inflatable member when in said second position to seal said end vent and an end sealing means disposed adjacent opposite end portions of said second elongated inflatable member to engage opposite end portions of said second elongated inflatable means when said second elongated inflatable means is in said second position to seal the end portions thereof.

10. The ventilated enclosure of claim 9 wherein said end sealing means comprises an arcuate member disposed to engage and seal the side of the end portion of said second elongated inflatable member when said second elongated inflatable means is in said second position.

11. The ventilated enclosure of claim 10 wherein said end sealing means further includes an end sealing member to engage and seal the end of said second elongated inflatable member when said second position.

12. The ventilated enclosure of claim 11 wherein said end sealing means includes an aperture formed therethrough to receive the end of said second elongated inflatable member therethrough.

13. The ventilated enclosure of claim 9 further including anchor means to secure said second elongated inflatable member to said ventilated enclosure comprising a first clamping member and a second clamping member to receive a portion of said second elongated inflatable member therebetween.

14. The ventilated enclosure of claim 13 wherein said first clamping member comprises a flat element having a first gripping element formed on the outer end thereof and said second clamping member comprises a flat element having a second gripping element formed on the outer end thereof, said first clamping member and said second clamping member cooperatively forming a slot therebetween to receive a portion of said second elongated inflatable member therebetween.

15. The ventilated enclosure of claim 14 wherein said flat elements of said first and second clamping members are disposed in substantially parallel relationship relative to each other and said first gripping element and said second gripping element to cooperatively form said slot S to receive and secure the inner edge of said second inflatable member to said ventilated enclosure.

16. The ventilated enclosure of claim 9 further including at least one elongated inner retainer element extending substantially the length of said ridge vent to engage the rear portion thereof in said first elongated inflatable member when in said second position to insure sealing thereof with first and second sealing member by forcing said first elongated inflatable member outwardly relative to said ridge vent and at least one elongated inner retainer element extending substantially the length of said side vent to engage the rear portion of said second elongated inflatable member when in said second position to insure sealing thereof with said first and second sealing member by forcing said second elongated inflatable member outward relative to said side vent.

* * * * *